(12) United States Patent
Peebler

(10) Patent No.: US 11,301,035 B1
(45) Date of Patent: Apr. 12, 2022

(54) METHOD AND DEVICE FOR VIDEO PRESENTATION

(71) Applicant: Apple Inc., Cupertino, CA (US)

(72) Inventor: Bradley Warren Peebler, Emerald Hills, CA (US)

(73) Assignee: APPLE INC., Cupertino, CA (US)

( * ) Notice: Subject to any disclaimer, the term of this patent is extended or adjusted under 35 U.S.C. 154(b) by 37 days.

(21) Appl. No.: 16/902,517

(22) Filed: Jun. 16, 2020

Related U.S. Application Data

(60) Provisional application No. 62/906,920, filed on Sep. 27, 2019.

(51) Int. Cl.
  *G06F 3/01* (2006.01)
  *G02B 27/00* (2006.01)
  *G02B 27/01* (2006.01)

(52) U.S. Cl.
  CPC ......... *G06F 3/012* (2013.01); *G02B 27/0093* (2013.01); *G02B 27/0172* (2013.01); *G02B 27/0179* (2013.01); *G02B 2027/014* (2013.01); *G02B 2027/0187* (2013.01)

(58) Field of Classification Search
  CPC . G06F 3/012; G02B 27/0093; G02B 27/0172; G02B 27/0179; G02B 2027/0187; G02B 2027/014
  See application file for complete search history.

(56) References Cited

U.S. PATENT DOCUMENTS

| | | | |
|---|---|---|---|
| 9,615,177 B2* | 4/2017 | Englert | G02B 27/0172 |
| 11,032,510 B2* | 6/2021 | Zhou | H04N 13/167 |
| 2005/0059488 A1* | 3/2005 | Larsen | A63F 13/213 |
| | | | 463/36 |
| 2017/0104927 A1 | 4/2017 | Mugavero et al. | |
| 2017/0155884 A1 | 6/2017 | Gronholm et al. | |
| 2018/0121069 A1* | 5/2018 | DiVerdi | G06F 3/011 |
| 2018/0332317 A1* | 11/2018 | Song | G06F 16/70 |
| 2019/0141252 A1 | 5/2019 | Pallamsetty | |
| 2021/0287447 A1* | 9/2021 | Koyama | G06F 3/013 |

* cited by examiner

*Primary Examiner* — Bryan Earles
(74) *Attorney, Agent, or Firm* — Fernando & Partners, LLP

(57) ABSTRACT

In one implementation, a method of displaying multiple video clips includes, while a head orientation of a user is a first head orientation represented by a first set of head orientation values, displaying, on the display, a first spatial portion of a first video clip. The method includes, in response to detecting a change in the head orientation to a second head orientation represented by a second set of head orientation values, displaying, on the display, a second spatial portion of the first video clip, wherein the second spatial portion is selected for display based on the second set of head orientation values. The method includes, while the head orientation is the second head orientation, displaying, on the display, a first spatial portion of a second video clip, wherein the first spatial portion of the second video clip is selected for display based on a predetermined head orientation value.

25 Claims, 11 Drawing Sheets

600

At a head-mounted device including one or more processors, non-transitory memory, and a display:

While a head orientation of a user is a first head orientation represented a first set of one or more head orientation values, displaying, on the display, a first spatial portion of a first video clip — 610

In response to detecting a change in the head orientation of the user from the first head orientation to a second head orientation represented by a second set of one or more head orientation values, displaying, on the display, a second spatial portion of the first video clip, wherein the second spatial portion of the first video clip is selected for display based on the second set of one or more head orientation values — 620

While the head orientation of the user is the second head orientation, displaying, on the display, a first spatial portion of a second video clip, wherein the first spatial portion of the second video clip is selected for display based on a predetermined head orientation value — 630

600

At a head-mounted device including one or more processors, non-transitory memory, and a display:

While a head orientation of a user is a first head orientation represented a first set of one or more head orientation values, displaying, on the display, a first spatial portion of a first video clip ⟶ 610

In response to detecting a change in the head orientation of the user from the first head orientation to a second head orientation represented by a second set of one or more head orientation values, displaying, on the display, a second spatial portion of the first video clip, wherein the second spatial portion of the first video clip is selected for display based on the second set of one or more head orientation values ⟶ 620

While the head orientation of the user is the second head orientation, displaying, on the display, a first spatial portion of a second video clip, wherein the first spatial portion of the second video clip is selected for display based on a predetermined head orientation value ⟶ 630

At a head-mounted device including one or more processors, non-transitory memory, and a display:

While a head orientation of a user is a first head orientation, displaying, on the display, a first spatial portion of a first video clip, wherein the first spatial portion of the first video clip includes a pixel location associated with the first head orientation ⟶ 710

In response to detecting a change in the head orientation of the user from the first head orientation to a second head orientation, displaying, on the display, a second spatial portion of the first video clip, wherein the second spatial portion of the first video clip does not include the pixel location associated with the first head orientation ⟶ 720

While the head orientation of the user is the second head orientation, displaying, on the display, a first spatial portion of a second video clip, wherein the first portion of the second video clip includes the pixel location associated with the first head orientation ⟶ 730

Figure 7

METHOD AND DEVICE FOR VIDEO PRESENTATION

CROSS-REFERENCE TO RELATED APPLICATIONS

This application claims priority to U.S. Provisional Patent App. No. 62/906,920, filed on Sep. 27, 2019, which is hereby incorporated by reference in its entirety.

TECHNICAL FIELD

The present disclosure generally relates to video presentation and, in particular, to systems, methods, and devices for displaying multiple 360-degree video clips in a computer-generated reality (CGR) environment.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands)

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a CGR environment presented by a device is a 360-degree video clip in which different spatial portions of the video clip are displayed depending on where the user is looking, e.g., based on the orientation of the user's head. In various implementations, when ending display of a first video clip and beginning display of a second video clip, the user may not be looking in the direction of the relevant spatial portion of the second video clip. Accordingly, methods and devices for presenting multiple 360-degree video clips sequentially while ensuring that the user sees the relevant spatial portions of each video clip may be desirable.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6 and 7 are flowchart representations of methods of displaying multiple video clips in accordance with some implementations.

Figure 1:
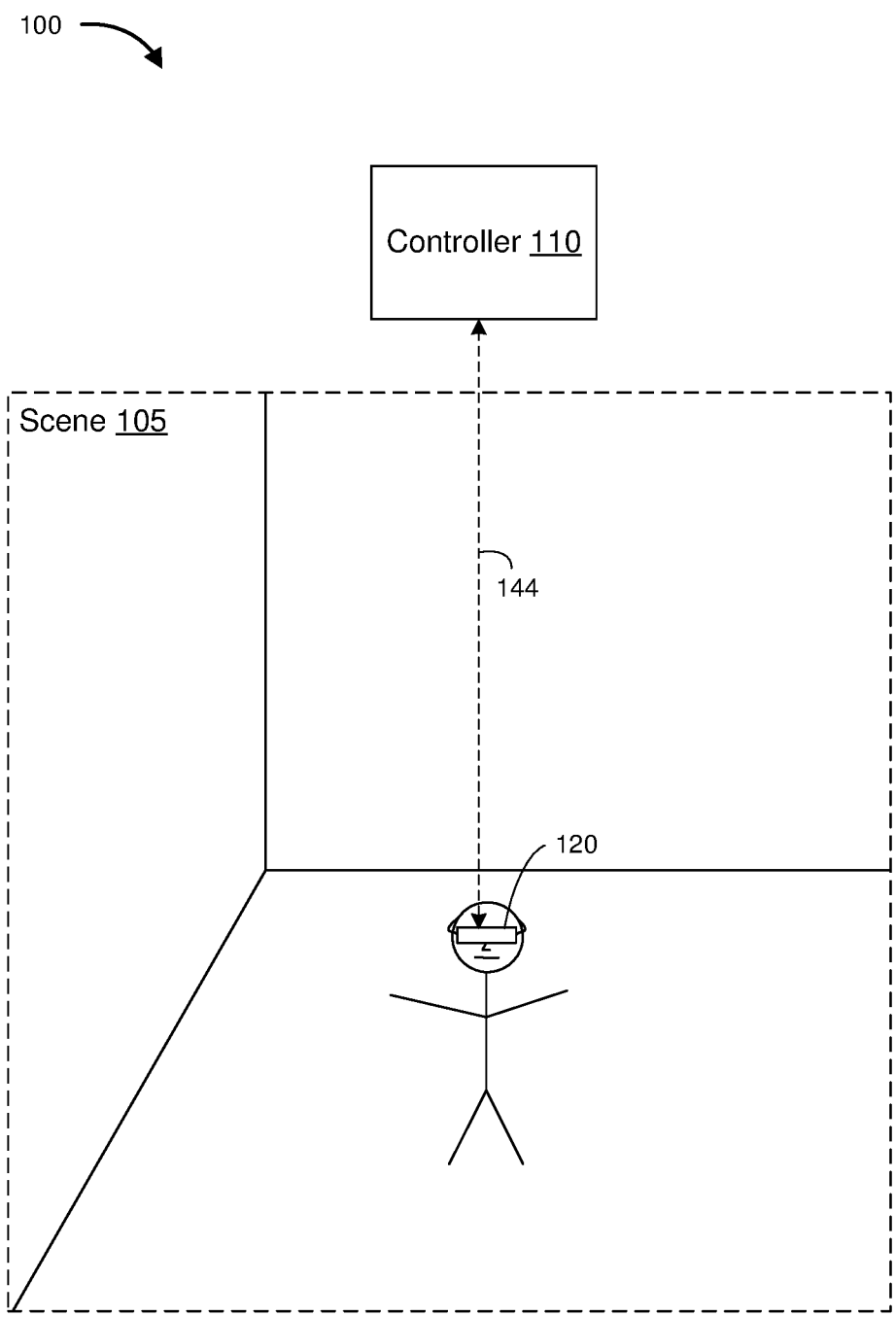
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying multiple video clips. In various implementations, a method is performed by a device including a processor, non-transitory memory, and a display. The method includes, while a head orientation of a user is a first head orientation, displaying, on the display, a first spatial portion of a first video clip, wherein the first spatial portion of the first video clip includes a pixel location associated with the first head orientation. The method includes, in response to detecting a change in head orientation of the user from the first head orientation to a second head orientation, displaying, on the display, a second spatial portion of the first video clip, wherein the second spatial portion of the first video clip does not include the pixel location associated with the first head orientation. The method includes, while the head orientation of the user is the second head orientation, displaying, on the display, a first spatial portion of a second video clip, wherein the first spatial portion of the second video clip includes the pixel location associated with the first head orientation.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Description

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, when transitioning between a first video clip and a second video clip, a user may not be looking in the direction of the relevant spatial portion of the second video clip. Thus, in various implementations, rather than display the relevant spatial portion at a default location, the relevant spatial portion is displayed where the user is looking when the second video clip begins.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120. According to some implementations, the HMD 120 presents CGR content to the user while the user is virtually and/or physically present within a scene 105.

In some implementations, the controller 110 is configured to manage and coordinate presentation of CGR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120.

In some implementations, the HMD 120 is configured to present the CGR content to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

In some implementations, the user wears the HMD 120 on his/her head. As such, the HMD 120 includes one or more CGR displays provided to display CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
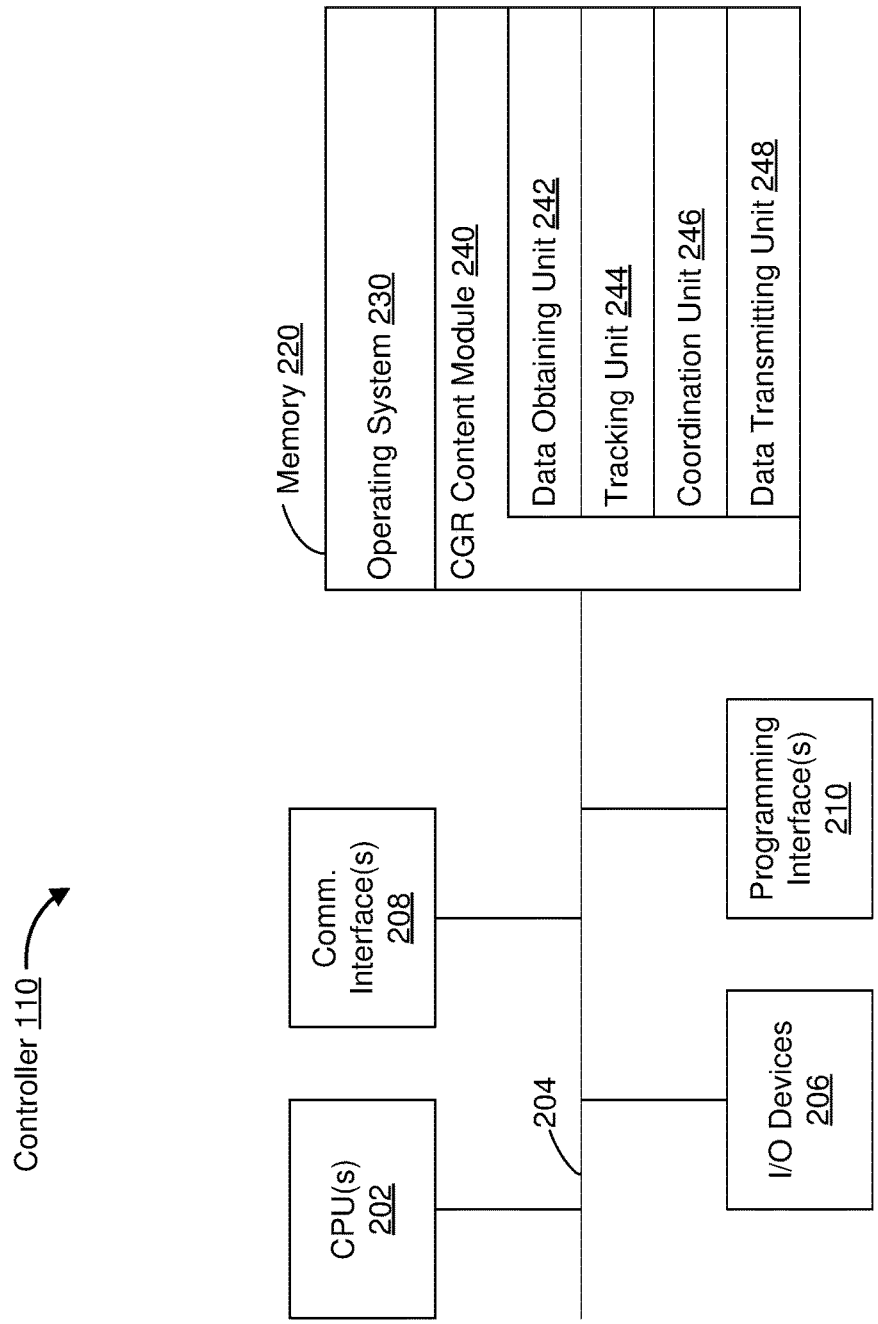
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR content module 240.

The operating system 230 includes procedures for handling various basic system services and for performing hardware dependent tasks. In some implementations, the CGR content module 240 is configured to manage and coordinate presentation of CGR content for one or more users (e.g., a single set of CGR content for one or more users, or multiple sets of CGR content for respective groups of one or more users). To that end, in various implementations, the CGR content module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120 of FIG. 1. To that end, in various implementations, the data obtaining unit 242 includes instructions and/or logic therefor, and heuristics and metadata therefor.

In some implementations, the tracking unit 244 is configured to map the scene 105 and to track the position, location, and/or orientation of at least the HMD 120 with respect to the scene 105 of FIG. 1. To that end, in various implementations, the tracking unit 244 includes instructions and/or logic therefor, and heuristics and metadata therefor.

In some implementations, the coordination unit 246 is configured to manage and coordinate the presentation of CGR content to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
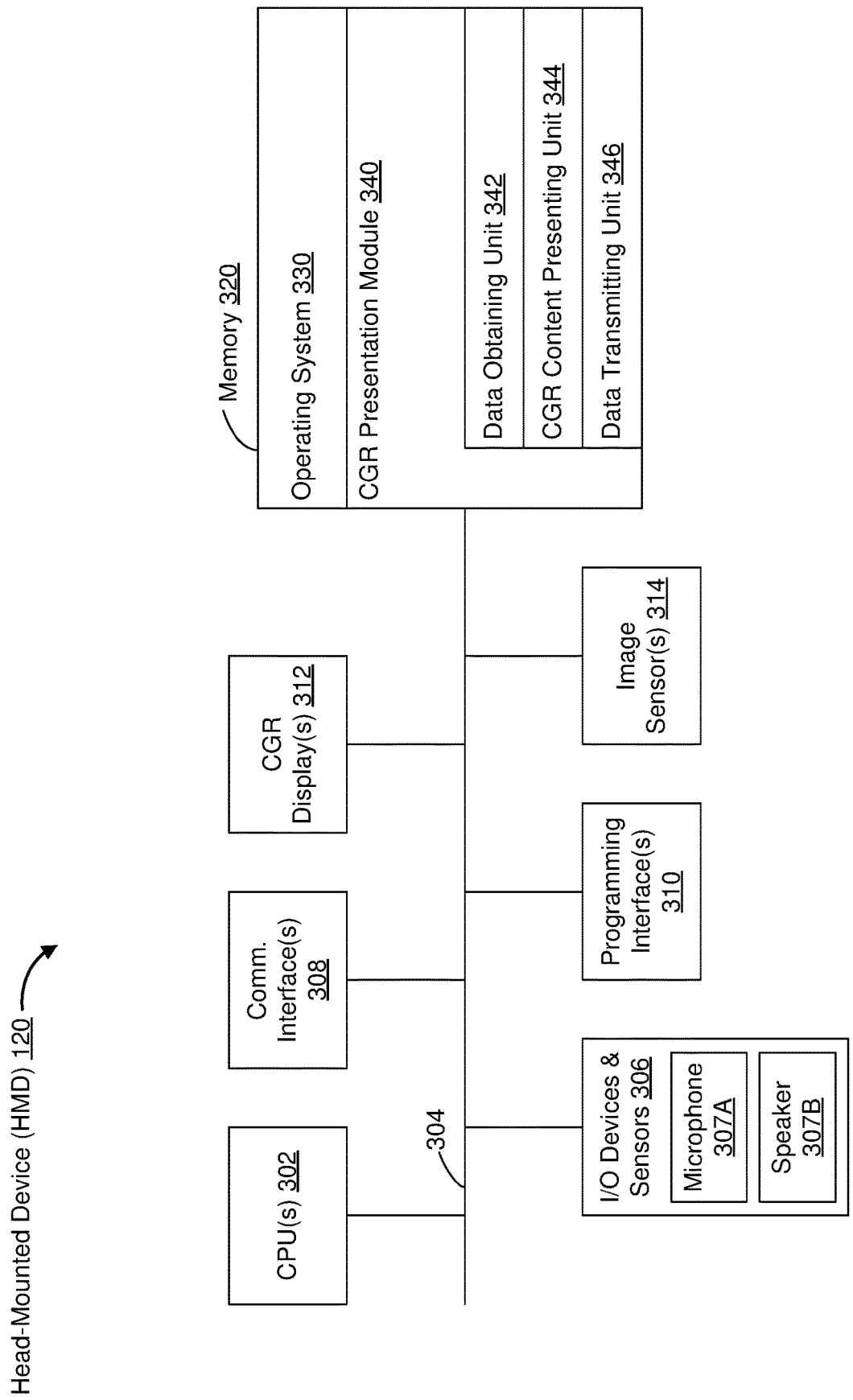
FIG. 3 is a block diagram of an example head-mounted device (HMD) in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to display CGR content to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting CGR content such as one or more 360-degree video clips.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312 and/or the I/O devices and sensors 306 (such as the one or more speakers 307B). To that end, in various implementations, the CGR presentation module 340 includes a data obtaining unit 342, a CGR content presenting unit 344, and a data transmitting unit 346.

In some implementations, the data obtaining unit 342 is configured to obtain data (e.g., presentation data, interaction data, sensor data, location data, etc.) from at least the controller 110 of FIG. 1. In various implementations, the data obtaining unit obtains one or more 360-degree video clips. To that end, in various implementations, the data obtaining unit 342 includes instructions and/or logic therefor, and heuristics and metadata therefor.

In some implementations, the CGR content presenting unit 344 is configured to present CGR content to a user. In various implementations, the CGR content presenting unit 344 presents a portion of a 360-degree video clip based on a user's head orientation. To that end, in various implementations, the CGR content presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the CGR content presenting unit 344, and the data transmitting unit 346 are shown as residing on a single device (e.g., the HMD 120 of FIG. 1), it should be understood that in other implementations, any combination of the data obtaining unit 342, the CGR content presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
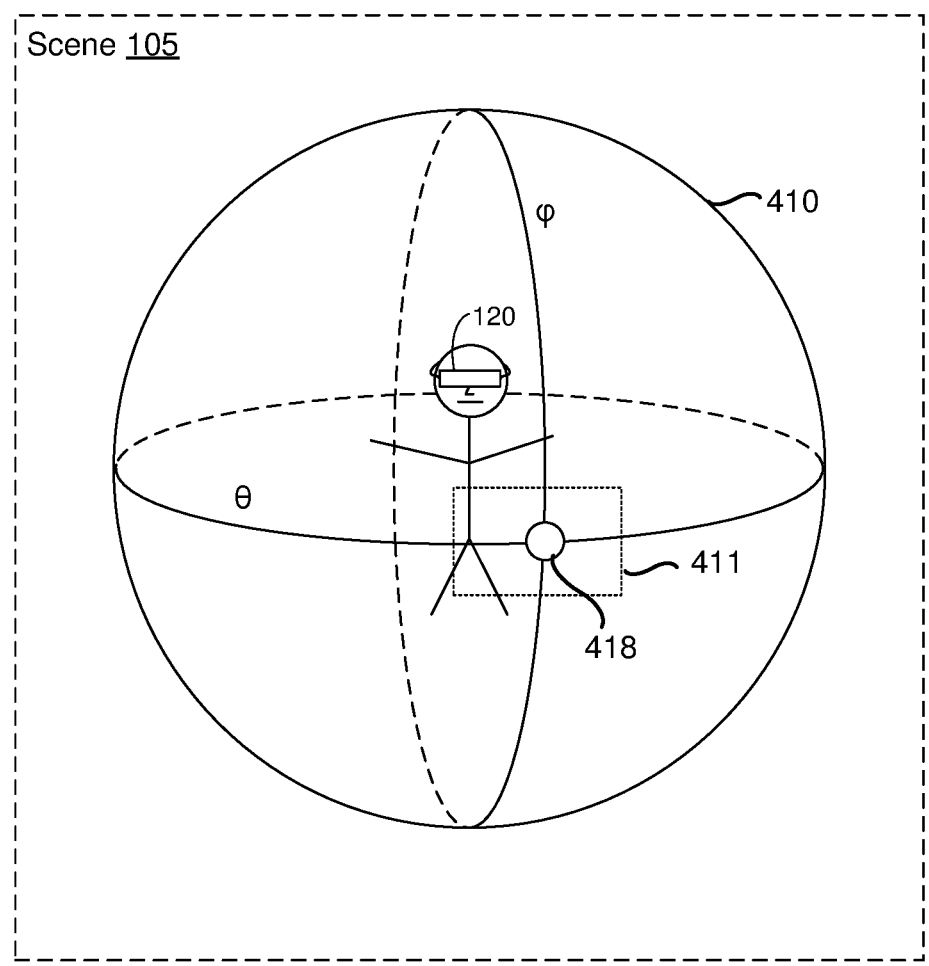
FIG. 4A-4C illustrate the scene of FIG. 1 at various times in accordance with some implementations.

FIG. 4A illustrates the scene 105 of FIG. 1 at a first time in accordance with some implementations. At the first time, while the head orientation of the user is a first head orientation, the HMD 120 displays a first spatial portion 411 of a first 360-degree video clip represented by a first sphere 410. The first spatial portion 411 includes a pixel 418 corresponding to the first head orientation. The head orientation of the user can be represented by a theta (θ) value defining rotation about a vertical axis, e.g., looking around, and a phi (φ) value defining rotation about a horizontal axis, e.g., looking up or down. In FIG. 4A, the first head orientation has a theta value of zero degrees and a phi value of zero degrees.

Figure 5A:
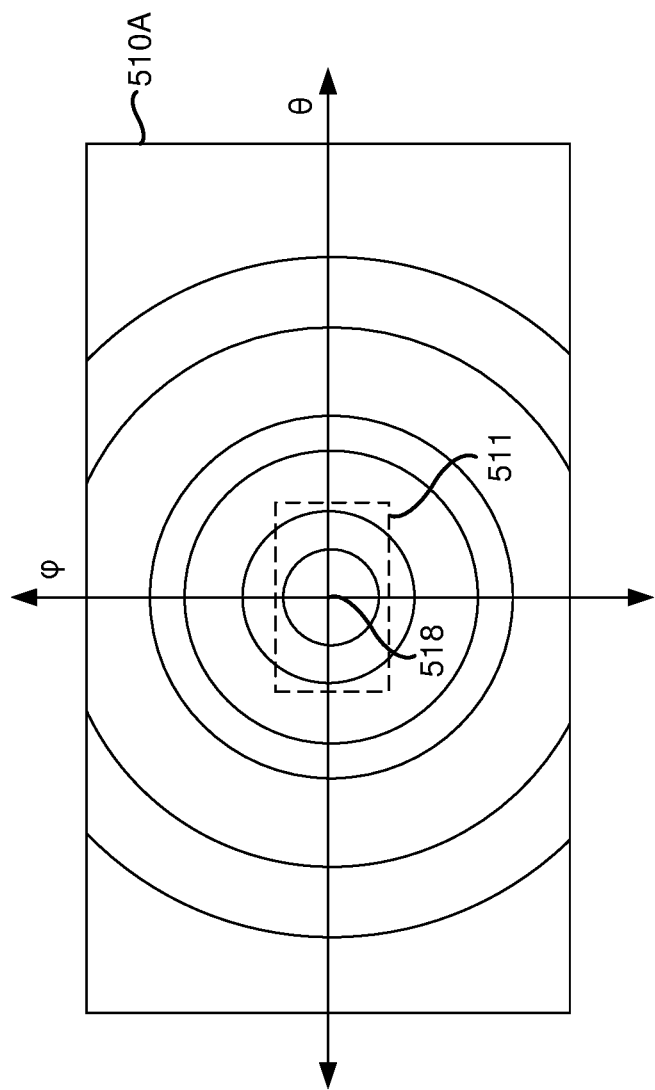
FIGS. 5A-5C illustrate example frames of video clips in accordance with some implementations.

FIG. 5A illustrates a first frame 510A of the first video clip. A 360-degree video clip includes a sequence of frames, each frame including a matrix of pixels having respective pixel values. Each pixel in the matrix is associated with a theta (θ) value and a phi value (φ) defining the pixel's location in the matrix.

Because the first head orientation has a theta value of zero degrees and a phi value of zero degrees, the HMD 120 displays a first spatial portion 511 of the first frame 510A, the first spatial portion 511 including a neighborhood around the pixel 518 associated with a theta value of zero degrees and a phi value of zero degrees, e.g., an origin or center of the first frame 510A.

Figure 4B:
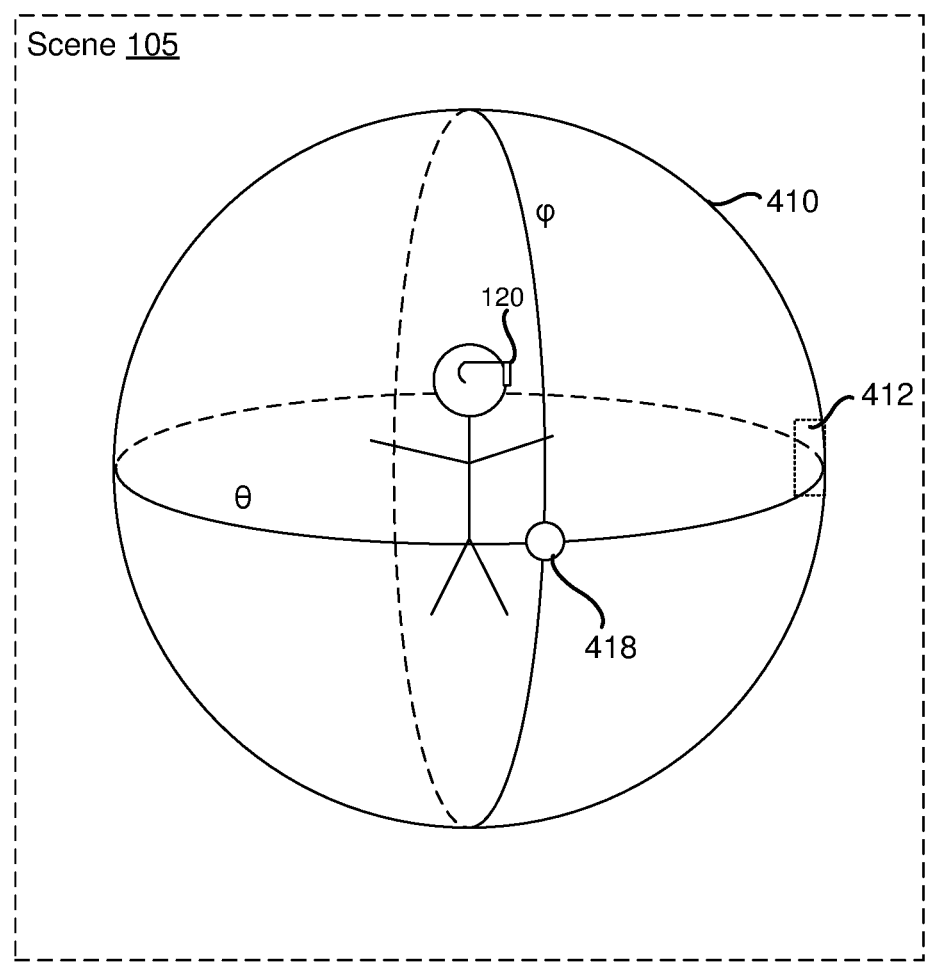

FIG. 4B illustrates the scene 105 of FIG. 1 at a second time in accordance with some implementations. At the second time, the head orientation of the user has changed from the first head orientation to a second head orientation. While the head orientation of the user is the second head orientation, the HMD 120 displays a second spatial portion 412 of the first 360-degree video clip represented by the first sphere 410. The second spatial portion 412 does not include the pixel 418 corresponding to the first head orientation. The second head orientation has a theta value of 90 degrees and a phi value of zero degrees.

Figure 5B:
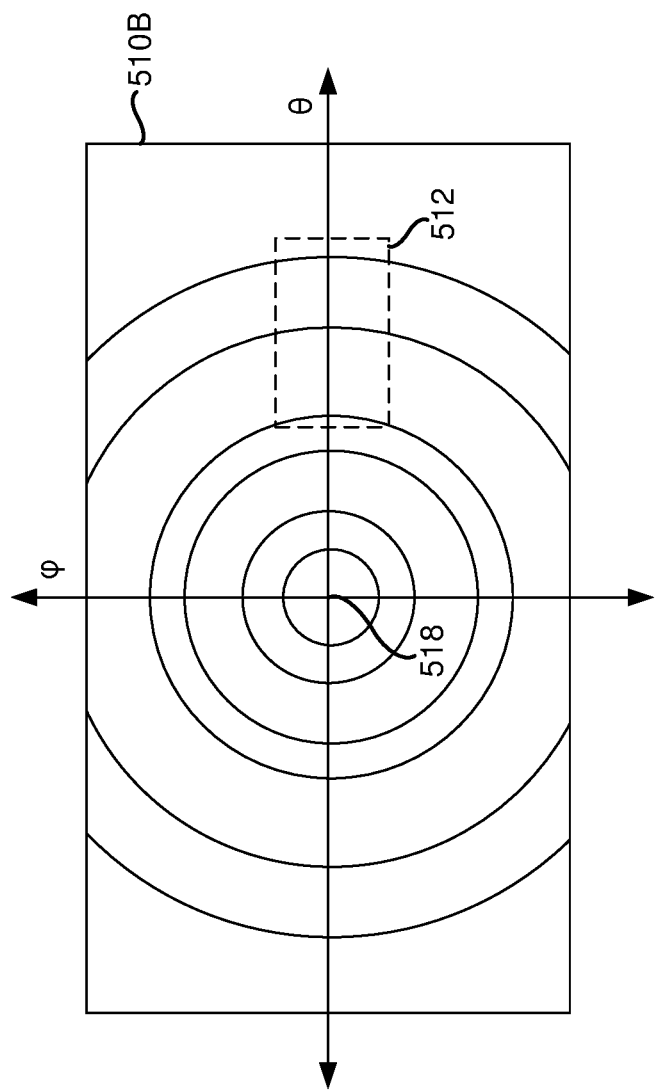

FIG. 5B illustrates a second frame 510B of the first video clip. Because the second head orientation has a theta value of 90 degrees and a phi value of zero degrees, the HMD 120 displays a second spatial portion 512 of the second frame 510B of the first video clip, the second spatial portion 512 including a neighborhood around a pixel associated with a theta value of 90 degrees and a phi value of zero degrees. The second spatial portion 512 does not include the pixel 518 associated with a theta value of zero degrees and a phi value of zero degrees.

Figure 4C:
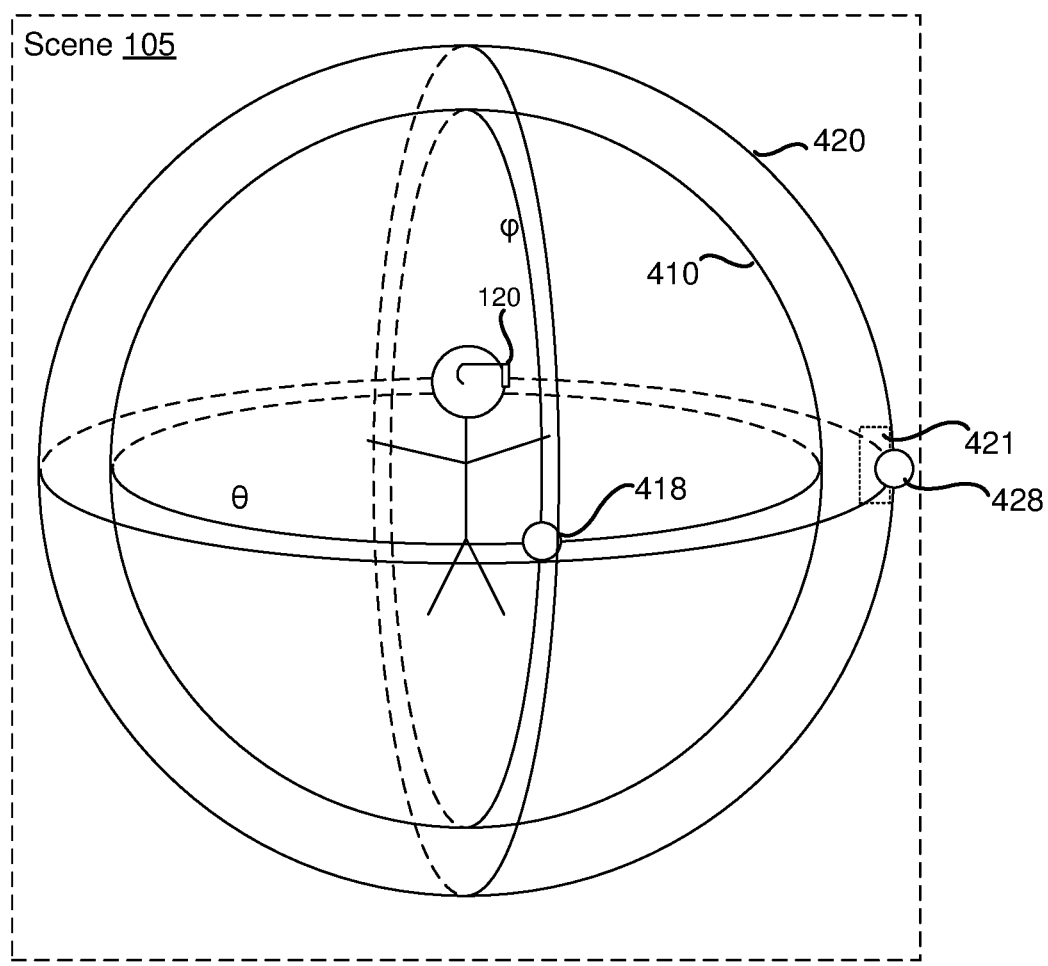

FIG. 4C illustrates the scene 105 of FIG. 1 at a third time in accordance with some implementations. At the third time, the head orientation of the user is still the second head orientation. While the head orientation of the user is the second head orientation, the HMD 120 displays a first spatial portion 421 of a second 360-degree video clip represented by a second sphere 420. The first spatial portion 421 includes a pixel 528 corresponding to the first head orientation, not the second head orientation. In other words, though the second head orientation had a theta value of 90 degrees and a phi value of zero degrees with respect to the first 360-degree video clip, one or both of values can be set to zero at the start of the second 360-degree video clip such that the user is looking at the portion of the second 360-degree video clip that the author or editor deemed most relevant. In some examples, only the theta value is set to zero at the start of the next 360-degree video clip. In other examples, both the theta value and the phi values are set to zero at the start of the next 360-degree video clip. In yet other examples, only the phi value is set to zero at the start of the next 360-degree video clip.

Figure 5C:
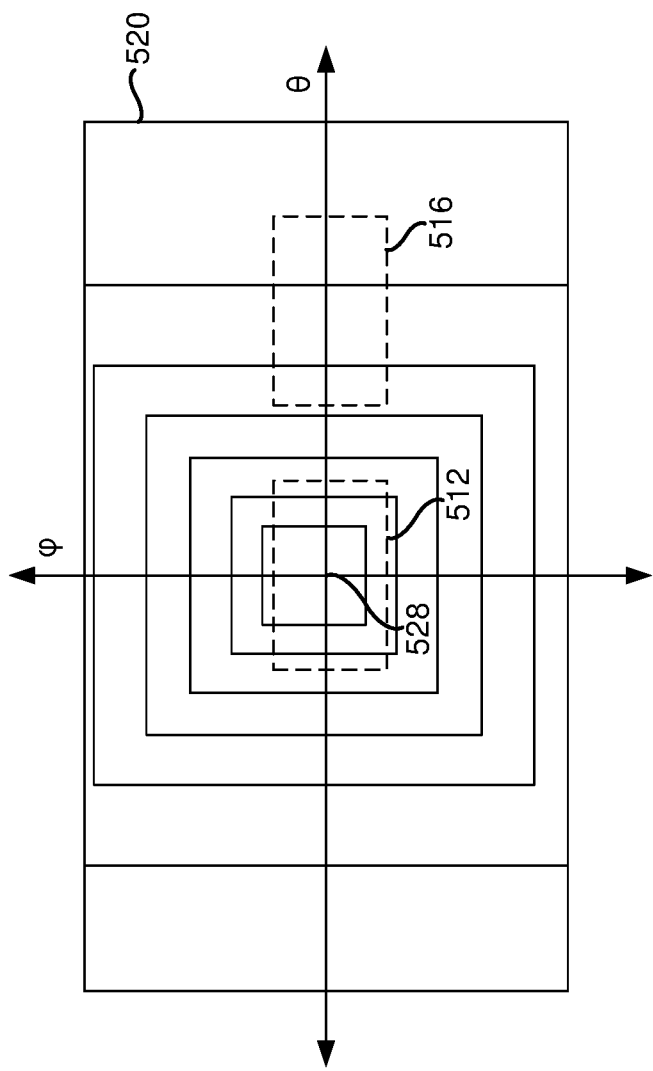

FIG. 5C illustrates a first frame 520 of the second video clip. Although the second head orientation has a theta value of 90 degrees and a phi value of zero degrees, rather than displaying a spatial portion 516 of the first frame 520 of the second video clip that includes a neighborhood around a pixel associated with a theta value of 90 degrees and a phi value of zero degrees, the HMD 120 displays a spatial portion 512 of the first frame 520 that includes a neighborhood around a pixel associated with a theta value of zero degrees and a phi value of zero degrees, e.g., the origin or center of the first frame 520 of the second video clip. Thus, when the second video clip begins playing, the user is looking at the relevant portion of the video clip.

FIG. 6 is a flowchart representation of a method of displaying multiple video clips in accordance with some implementations. In various implementations, the method 600 is performed by a device with one or more processors, non-transitory memory, and a display (e.g., the HMD 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with, while a head orientation of a user is a first head orientation represented by a first set of one or more head orientation values, displaying, on the display, a first spatial portion of a first video clip.

In various implementations, the first set of one or more head orientation values includes a first theta value corresponding to an amount of rotation about a vertical axis. In various implementations, a theta value of zero degrees corresponds to north or a different cardinal direction. In various implementations, the first head orientation defines a theta value of zero degrees (e.g., whatever direction the user is facing in the first head orientation is considered a theta value of zero degrees). In various implementations, the head orientation is only defined by the first theta value. Thus, when the first theta value is, e.g., zero degrees, the same spatial portion of a video clip is displayed regardless of whether the user tilts his or her head, e.g., looking up or down.

In various implementations, the first set of one or more head orientation values includes a first phi value corresponding to an amount of rotation about a horizontal axis. In various implementations, a phi value of zero corresponds the head being level with the ground. In various implementations, the first head orientation defines a phi value of zero degrees (e.g., whatever angle at which the head of the user is held in the first head orientation is considered a phi value of zero degrees).

In various implementations, the first video clip is a 360-degree video clip including pixels corresponding to any value of the first theta value. In various implementations, the first video clip is a 360-degree×360-degree video clip including pixels corresponding to any values of the first theta value and first phi value.

In various implementations, the first spatial portion of the first video clip is selected for display based on both the first theta value and the first phi value. For example, if the first theta value is 15 degrees and the first phi value is 15 degrees, the first spatial portion of the first video clip includes a pixel associated with a theta value of 15 and a phi value of 15. As another example, if the first theta value is zero degrees and the first phi value is 15 degrees, the first spatial portion of the first video clip includes a pixel associated with a theta value of zero and a phi value of 15. As another example, if the first theta value is zero degrees and the first phi value is zero degrees, the first spatial portion of the first video clip includes a pixel associated with a theta value of zero and the phi value of zero.

For example, in FIGS. 4A and 5A, the head orientation of the user is the first head orientation having a theta value of zero degrees and a phi value of zero degrees. Accordingly, the HMD 120 displays the first spatial portion 511 of the first frame 510A of the first video clip including the pixel 518 associated with a theta value of zero and a phi value of zero.

In various implementations, the first spatial portion of the first video clip is selected for display based on a theta value of zero and the first phi value. Thus, when the series of video clips begins playing, regardless of the user's head orientation about the vertical axis, the user begins seeing the center of the first video clip. For example, if the first theta value is 15 degrees and the first phi value is 15 degrees, the first spatial portion of the first video clip includes a pixel associated with a theta value of zero and a phi value of 15. As another example, if the first theta value is zero degrees and the first phi value is 15 degrees, the first spatial portion of the first video clip includes a pixel associated with a theta value of zero and a phi value of 15. As another example, if the first theta value is zero degrees and the first phi value is zero degrees, the first spatial portion of the first video clip includes a pixel associated with a theta value of zero and the phi value of zero.

If various implementations, the first spatial portion of the first video clip is selected for display based on a theta value of zero and a phi value of zero. For example, if the if the first theta value is 15 degrees and the first phi value is 15 degrees, the first spatial portion of the first video clip includes a pixel associated with a theta value of zero and a phi value of zero. As another example, if the first theta value is zero degrees and the first phi value is 15 degrees, the first spatial portion of the first video clip includes a pixel associated with a theta value of zero and a phi value of zero. As another example, if the first theta value is zero degrees and the first phi value is zero degrees, the first spatial portion of the first video clip includes a pixel associated with a theta value of zero and the phi value of zero.

The method 600 continues, in block 620, with, in response to detecting a change in the head orientation of the user from the first head orientation to a second head orientation represented by a second set of one or more head orientation values, displaying, on the display, a second spatial portion of the first clip of video, wherein the second spatial portion of the first video clip is selected for display based on the second set of one or more head orientation values.

In various implementations, the second set of one or more head orientation values includes a second theta value corresponding to an amount of rotation about the vertical axis. In various implementations, the second set of one or more head orientation values includes a second phi value corresponding to an amount of rotation about the horizontal axis.

In various implementations, the second spatial portion of the first video clip is selected for display based directly on the second theta value and the second phi value (irrespective of the first theta value and the first phi value). For example, if the first theta value is 15 degrees, the first phi value is 15 degrees, the second theta value is 40 degrees, and the second phi value is 40 degrees, the second spatial portion of the first video clip includes a pixel associated with a theta value of 40 and a phi value of 40. As another example, if the first theta value is zero degrees, the first phi value is zero degrees, the second theta value is 90 degrees and the second phi value is zero degrees, the second spatial portion of the first video clip includes a pixel associated with a theta value of 90 and a phi value of zero.

In various implementations, the second spatial portion of the first video clip is selected for display based on the second theta value, the second phi value, and the first theta value (but not the first phi value). For example, in various implementations, the second spatial portion of the first video clip is selected for display based on the second phi value and the difference between the first theta value and the second theta value. For example, if the first theta value is 15 degrees, the first phi value is 15 degrees, the second theta value is 40 degrees, and the second phi value is 40 degrees, the second spatial portion of the first video clip includes a pixel associated with a theta value of 25 (e.g., 40-15) and a phi value of 40. As another example, if the first theta value is zero degrees, the first phi value is zero degrees, the second theta value is 90 degrees and the second phi value is zero degrees, the second spatial portion of the first video clip includes a pixel associated with a theta value of 90 (e.g., 90-0) and a phi value of zero.

In various implementations, the second spatial portion of the first video clip is selected for display based on the second theta value, the second phi value, the first theta value, and the first phi value. For example, in various implementations, the second spatial portion of the first video clip is selected for display based on the difference between the first theta value and the second theta value and the difference between the first phi value and the second phi value. For example, if the first theta value is 15 degrees, the first phi value is 15 degrees, the second theta value is 40 degrees, and the second phi value is 40 degrees, the second spatial portion of the first video clip includes a pixel associated with a theta value of 25 (e.g., 40-15) and a phi value of 25 (e.g., 40-15). As another example, if the first theta value is zero degrees, the first phi value is zero degrees, the second theta value is 90 degrees and the second phi value is zero degrees, the second spatial portion of the first video clip includes a pixel associated with a theta value of 90 (e.g. 90-0) and a phi value of zero (e.g., 0-0).

For example, in FIGS. 4B and 5B, the head orientation of the user has changed from the first head orientation to the second head orientation having a theta value of 90 degrees and a phi value of zero degrees. Accordingly, the HMD 120 displays the second spatial portion 512 of the second frame 510B of the first video clip that does not include the pixel 518 associated with a theta value of zero and a phi value of zero.

The method 600 continues, in block 630, with, while the head orientation of the user is the second head orientation, displaying, on the display, a first spatial portion of a second video clip, wherein the first portion of the second video clip is selected for display based on a predetermined head orientation value.

In various implementations, the predetermined head orientation value is a theta value of zero degrees. For example, if the first theta value is 15 degrees, the first phi value is 15 degrees, the second theta value is 40 degrees, and the second phi value is 40 degrees, the first spatial portion of the second video clip includes a pixel associated with a theta value of zero and a phi value of 40 (e.g., the second phi value). As another example, if the first theta value is zero degrees, the first phi value is zero degrees, the second theta value is 90 degrees and the second phi value is zero degrees, the second spatial portion of the first video clip includes a pixel associated with a theta value of zero and a phi value of zero (e.g., the second phi value).

In various implementations, the predetermined head orientation value is the first theta value. For example, if the first theta value is 15 degrees, the first phi value is 15 degrees, the second theta value is 40 degrees, and the second phi value is 40 degrees, the first spatial portion of the second video clip includes a pixel associated with a theta value of 15 and a phi value of 40 (e.g., the second phi value). As another example, if the first theta value is zero degrees, the first phi value is zero degrees, the second theta value is 90 degrees and the second phi value is zero degrees, the second spatial portion of the first video clip includes a pixel associated with a theta value of zero and a phi value of zero (e.g., the second phi value).

In various implementations, the predetermined head orientation value is a theta value of zero degrees and a phi value of zero degrees. For example, if the first theta value is 15 degrees, the first phi value is 15 degrees, the second theta value is 40 degrees, and the second phi value is 40 degrees, the first spatial portion of the second video clip includes a pixel associated with a theta value of zero and a phi value of zero. As another example, if the first theta value is zero degrees, the first phi value is zero degrees, the second theta value is 90 degrees and the second phi value is zero degrees, the second spatial portion of the first video clip includes a pixel associated with a theta value of zero and a phi value of zero.

In various implementations, the predetermined head orientation value is the first theta value and the first phi value. For example, if the first theta value is 15 degrees, the first phi value is 15 degrees, the second theta value is 40 degrees, and the second phi value is 40 degrees, the first spatial portion of the second video clip includes a pixel associated with a theta value of 15 and a phi value of 15. As another example, if the first theta value is zero degrees, the first phi value is zero degrees, the second theta value is 90 degrees and the second phi value is zero degrees, the second spatial portion of the first video clip includes a pixel associated with a theta value of zero and a phi value of zero.

For example, in FIGS. 4C and 5C, the head orientation of the user remains the second head orientation having a theta value of 90 degrees and a phi value of zero degrees. However, the HMD 120 displays the spatial portion 512 of the first frame 520 of the second video clip that includes the pixel 528 associated with a theta value of zero and a phi value of zero.

In various implementations, while the head orientation of the user is the second head orientation, the device transitions between the first video clip and second video clip. In various implementations, the device cuts from the first video clip to the second video clip such that when the second video clip starts, the first video clip ends. Accordingly, in various implementations, the method 600 further includes ceasing to display the second spatial portion of the first video clip when starting to display the first spatial portion of the second video clip. In various implementations, the device fades or wipes from the first video clip to the second video clip such that, briefly, both the first video clip and the second video clip are displayed. Accordingly, in various implementations, the method 600 further includes ceasing to display the second spatial portion of the first video clip after starting to display the first spatial portion of the second video clip.

In various implementations, the device further changes the spatial portion of the second video clip displayed based on a further change in head orientation of the user. Thus, in various implementations, the method 600 further includes, in response to detecting a change in the head orientation of the user from the second head orientation to a third head orientation represented by a third set of one or more head orientation values, displaying, on the display, a second spatial portion of the second video clip, wherein the second spatial portion of the second video clip is selected for display based on the third set of one or more head orientation values.

In various implementations, the third set of one or more head orientation values includes a third theta value corresponding to an amount of rotation about the vertical axis. In various implementations, the third set of one or more head orientation values includes a third phi value corresponding to an amount of rotation about the horizontal axis.

In various implementations, the second spatial portion of the second video clip is selected for display based on a difference between the third set of one or more head orientation values and the second set of one or more head orientation values.

Thus, as an example where the phi value of the head orientation is always zero degrees, when the first theta value is zero degrees, the device displays (in block 610) the first spatial portion of the first video clip including a pixel location associated with a theta value of zero degrees. When the second theta value is 90 degrees, the device displays (in block 620) the second spatial portion of the first video clip including a pixel location associated with a theta value of 90 degrees. To transition to the second video clip, the device displays (in block 630) the first spatial portion of the second video clip including a pixel location associated with a theta value of zero degrees (e.g., a predetermined theta value).

When the third theta value is 135 degrees, the device displays the second spatial portion of the second video clip including a pixel location associated with a theta value of 45 degrees (e.g., the difference between the second theta value and the third theta value).

In various implementations, the device further transitions from the second video clip to a third video clip. In various implementations, it may be advantageous to display the center of the third video clip where the user is looking. Thus, in various implementations, the method 600 further includes, while the head orientation of the user is the third head orientation, displaying, on the display, a first spatial portion of a third video clip, wherein the first spatial portion of the third video clip is selected for display based on the predetermined head orientation value.

However, in various implementations, such as a transition from a day shot to a night shot of the same scene, it may be advantageous to display the center of the third video clip at the same location the center of the second video clip was displayed. Thus, if the user is looking at an object away from the center of the second video clip, the user sees the same object in the third video clip.

Thus, as an example where the phi value of the head orientation is always zero degrees, when the first theta value is zero degrees, the device displays (in block 610) the first spatial portion of the first video clip including a pixel location associated with a theta value of zero degrees. When the second theta value is 90 degrees, the device displays (in block 620) the second spatial portion of the first video clip including a pixel location associated with a theta value of 90 degrees. To transition to the second video clip, the device displays (in block 630) the first spatial portion of the second video clip including a pixel location associated with a theta value of zero degrees (e.g., the predetermined theta value). When the third theta value is 135 degrees, the device displays the second spatial portion of the second video clip including a pixel location associated with a theta value of 45 degrees (e.g., the difference between the second theta value and the third theta value). To transition to the third video clip, the device displays the first spatial portion of the third video clip including a pixel location associated with a theta value of 45 degrees (e.g., the same as the second spatial portion of the second video clip).

Accordingly, in various implementations, the method 700 includes, while the head orientation of the user is the third head orientation, displaying, on the display, a first spatial portion of a third video clip, wherein the first spatial portion of the third video clip is selected for display based on the third set of one or more head orientation values. In various implementations, the first spatial portion of the third video clip is selected for display based on a difference between the third set of one or more head orientation values and the second set of one or more head orientation values.

FIG. 7 is a flowchart representation of a method of displaying multiple video clips in accordance with some implementations. In various implementations, the method 700 is performed by a device with one or more processors, non-transitory memory, and a display (e.g., the HMD 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with, while a head orientation of a user is a first head orientation, displaying, on the display, a first spatial portion of a first video clip, wherein the first spatial portion of the first video clip includes a pixel location associated with the first head orientation.

For example, in FIGS. 4A and 5A, the head orientation of the user is the first head orientation having a theta value of zero degrees and a phi value of zero degrees. Accordingly, the HMD 120 displays the first spatial portion 511 of the first frame 510A of the first video clip including the pixel 518 associated with a theta value of zero and a phi value of zero.

In various implementations, the pixel location associated with the first head orientation is a video clip center or origin.

In various implementations, the first spatial portion of the first video clip includes a neighborhood around the pixel location associated with the first head orientation.

The method 700 continues, in block 720, with, in response to detecting a change in the head orientation of the user from the first head orientation to a second head orientation, displaying, on the display, a second spatial portion of the first clip of video, wherein the second spatial portion of the first video clip does not include the pixel location associated with the first head orientation.

For example, in FIGS. 4B and 5B, the head orientation of the user has changed from the first head orientation to the second head orientation having a theta value of 90 degrees and a phi value of zero degrees. Accordingly, the HMD 120 displays the second spatial portion 512 of the second frame 510B of the first video clip that does not include the pixel 518 associated with a theta value of zero and a phi value of zero.

In various implementations, the second spatial portion of the first video clip includes a pixel location associated with the second head orientation. In various implementations, the second spatial portion of the first video clip includes a neighborhood around the pixel location associated with the second head orientation.

The method 700 continues, at block 730, with, while the head orientation of the user is the second head orientation, displaying, on the display, a first spatial portion of a second video clip, wherein the first spatial portion of the second video clip includes the pixel location associated with the first head orientation.

For example, in FIGS. 4C and 5C, the head orientation of the user remains the second head orientation having a theta value of 90 degrees and a phi value of zero degrees. However, the HMD 120 displays the spatial portion 512 of the first frame 520 of the second video clip that includes the pixel 528 associated with a theta value of zero and a phi value of zero.

In various implementations, while the head orientation of the user is the second head orientation, the device transitions between the first video clip and second video clip. In various implementations, the device cuts from the first video clip to the second video clip such that when the second video clip starts, the first video clip ends. Accordingly, in various implementations, the method 700 further includes ceasing to display the second spatial portion of the first video clip when starting to display the first spatial portion of the second video clip. In various implementations, the device fades or wipes from the first video clip to the second video clip such that, briefly, both the first video clip and the second video clip are displayed. Accordingly, in various implementations, the method 700 further includes ceasing to display the second spatial portion of the first video clip after starting to display the first spatial portion of the second video clip.

In various implementations, the head orientation is defined by a theta value corresponding to an amount of rotation about a vertical axis. In various implementations, the first video clip is a 360-degree video clip including pixels corresponding to any value of the theta value. In various implementations, the head orientation is also defined by a phi value corresponding to an amount of rotation about a horizontal axis. In various implementations, the first video clip is a 360-degree×360-degree video clip including pixels corresponding to any values of the theta value and phi value.

In various implementations, the head orientation is only defined by the theta value. Thus, when the theta value is, e.g., zero degrees, the same spatial portion of a video clip is displayed regardless of whether the user tilts his or her head, e.g., looking up or down. In various implementations, the head orientation is defined by both the theta value and the phi value, but only the theta value of the second head orientation is used in determining which spatial portion of the second video clip is displayed. Thus, for example, when the first head orientation has a theta value of zero degrees and a phi value of zero degrees, the device displays (in block 610) the first spatial portion of the first video clip including a pixel location associated with a theta value of zero degrees and a phi value of zero degrees. When the second head orientation has a theta value of 90 degrees and a phi value of 45 degrees, the device displays (in block 620) the second spatial portion of the first video clip including a pixel location associated with a theta value of 90 degrees and a phi value of 45 degrees. To transition to the second video clip, the device displays (in block 630) the first spatial portion of the second video clip including a pixel location associated with a theta value of zero degrees (from the first head orientation) and a phi value of 45 degrees (from the second head orientation). Accordingly, in various implementations, displaying the first spatial portion of the second video clip is based on the theta value of the first head orientation and the phi value of the second head orientation.

In various implementations, the device further changes the spatial portion of the second video clip displayed based on a further change in head orientation of the user. Thus, in various implementations, the method 600 further includes, in response to detecting a change in the head orientation of the user from the second head orientation to a third head orientation, displaying, on the display, a second spatial portion of the second video clip, wherein the second spatial portion of the second video clip does not include the pixel location associated with the first head orientation. In various implementations, the second spatial portion of the second video clip includes a pixel location associated with a difference between the second head orientation and the third head orientation.

Thus, as an example where the phi value of the head orientation is always zero degrees, when the first head orientation has a theta value of zero degrees, the device displays (in block 610) the first spatial portion of the first video clip including a pixel location associated with a theta value of zero degrees. When the second head orientation has a theta value of 90 degrees, the device displays (in block 620) the second spatial portion of the first video clip including a pixel location associated with a theta value of 90 degrees. To transition to the second video clip, the device displays (in block 630) the first spatial portion of the second video clip including a pixel location associated with a theta value of zero degrees (from the first head orientation). When the third head orientation has a theta value of 135 degrees, the device displays the second spatial portion of the second video clip including a pixel location associated with a theta value of 45 degrees (e.g., the difference between the second head orientation and the third head orientation).

In various implementations, the device further transitions from the second video clip to a third video clip. In various implementations, it may be advantageous to display the center of the third video clip where the user is looking. Thus, in various implementations, the method 600 further includes, while the head orientation of the user is the third head orientation, displaying, on the display, a first spatial portion of a third video clip, wherein the first spatial portion of the third video clip includes the pixel location associated with the first head orientation.

However, in various implementations, such as a transition from a day shot to a night shot of the same scene, it may be advantageous to display the center of the third video clip at the same location the center of the second video clip was displayed. Thus, if the user is looking at an object away from the center of the second video clip, the user sees the same object in the third video clip.

Thus, as an example where the phi value of the head orientation is always zero degrees, when the first head orientation has a theta value of zero degrees, the device displays (in block 610) the first spatial portion of the first video clip including a pixel location associated with a theta value of zero degrees. When the second head orientation has a theta value of 90 degrees, the device displays (in block 620) the second spatial portion of the first video clip including a pixel location associated with a theta value of 90 degrees. To transition to the second video clip, the device displays (in block 630) the first spatial portion of the second video clip including a pixel location associated with a theta value of zero degrees (from the first head orientation). When the third head orientation has a theta value of 135 degrees, the device displays the second spatial portion of the second video clip including a pixel location associated with a theta value of 45 degrees (e.g., the difference between the second head orientation and the third head orientation). To transition to the third video clip, the device displays the first spatial portion of the third video clip including a pixel location associated with a theta value of 45 degrees (e.g., the same as the second spatial portion of the second video clip).

Accordingly, in various implementations, the method 700 further includes, while the head orientation of the user is the third head orientation, displaying, on the display, a first spatial portion of a third video clip, wherein the first spatial portion of the third video clip does not include the pixel location associated with the first head orientation. In various implementations, the first spatial portion of the third video clip includes a pixel location associated with the difference between the second head orientation and the third head orientation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a head-mounted device including one or more processors, non-transitory memory, and a display:
   while a head orientation of a user is a first head orientation represented by a first set of one or more head orientation values, displaying, on the display, a first spatial portion of a first video clip;
   in response to detecting a change in the head orientation of the user from the first head orientation to a second head orientation represented by a second set of one or more head orientation values, displaying, on the display, a second spatial portion of the first video clip, wherein the second spatial portion of the first video clip is selected for display based on the second set of one or more head orientation values; and
   while the head orientation of the user is the second head orientation, displaying, on the display, a first spatial portion of a second video clip that is selected for display based on a predetermined head orientation value while forgoing display of a second spatial portion of the second video clip that would be selected for display based on the second set of one or more head orientation values representing the second head orientation.

2. The method of claim 1, wherein the second set of one or more head orientation values includes a theta value corresponding to an amount of rotation about a vertical axis and the predetermined head orientation value is a predetermined theta value corresponding to an amount of rotation about the vertical axis.

3. The method of claim 2, wherein the second set of one or more head orientation values includes a phi value corresponding to an amount of rotation about a horizontal axis, wherein the first spatial portion of the second video clip is selected for display based on the phi value.

4. The method of claim 1, wherein the first video clip is a 360-degree video clip.

5. The method of claim 1, wherein the first video clip is a 360-degree×360-degree video clip.

6. The method of claim 1, further comprising, ceasing to display the second spatial portion of the first video clip when starting to display the first spatial portion of the second video clip.

7. The method of claim 1, further comprising, ceasing to display the second spatial portion of the first video clip after starting to display the first spatial portion of the second video clip.

8. The method of claim 1, further comprising, in response to detecting a change in the head orientation of the user from the second head orientation to a third head orientation represented by a third set of one or more head orientation values, displaying, on the display, a second spatial portion of the second video clip, wherein the second spatial portion of the second video clip is selected for display based on the third set of one or more head orientation values.

9. The method of claim 8, wherein the second spatial portion of the second video clip is selected for display based on a difference between the third set of one or more head orientation values and the second set of one or more head orientation values.

10. The method of claim 8, further comprising, while the head orientation of the user is the third head orientation, displaying, on the display, a first spatial portion of a third video clip, wherein the first spatial portion of the third clip is selected for display based on the predetermined head orientation value.

11. The method of claim 8, further comprising, while the head orientation of the user is the third head orientation, displaying, on the display, a first spatial portion of a third video clip, wherein the first spatial portion of the third video clip is selected for display based on the third set of one or more head orientation values.

12. The method of claim 11, wherein the first spatial portion of the third video clip is selected for display based on a difference between the third set of one or more head orientation values and the second set of one or more head orientation values.

13. A device comprising:
   a display;
   a non-transitory memory; and
   one or more processors to:
      while a head orientation of a user is a first head orientation represented by a first set of one or more head orientation values, display, on the display, a first spatial portion of a first video clip;
      in response to detecting a change in the head orientation of the user from the first head orientation to a second head orientation represented by a second set of one or more head orientation values, display, on the display, a second spatial portion of the first video clip, wherein the second spatial portion of the first video clip is selected for display based on the second set of one or more head orientation values; and while the head orientation of the user is the second head orientation, display, on the display, a first spatial portion of a second video clip that is selected for display based on a predetermined head orientation value while forgoing display of a second spatial portion of the second video clip that would be selected for display based on the second set of one or more head orientation values representing the second head orientation.

14. The device of claim 13, wherein the second set of one or more head orientation values includes a theta value corresponding to an amount of rotation about a vertical axis and the predetermined head orientation value is a predetermined theta value corresponding to an amount of rotation about the vertical axis.

15. The device of claim 14, wherein the second set of one or more head orientation values includes a phi value corresponding to an amount of rotation about a horizontal axis, wherein the first spatial portion of the second video clip is selected for display based on the phi value.

16. The device of claim 13, wherein the one or more processors are further to, in response to detecting a change in the head orientation of the user from the second head orientation to a third head orientation represented by a third set of one or more head orientation values, displaying, on the display, a second spatial portion of the second video clip, wherein the second spatial portion of the second video clip is selected for display based on the third set of one or more head orientation values.

17. The device of claim 16, wherein the second spatial portion of the second video clip is selected for display based on a difference between the third set of one or more head orientation values and the second set of one or more head orientation values.

18. The device of claim 16, further comprising, while the head orientation of the user is the third head orientation, displaying, on the display, a first spatial portion of a third video clip, wherein the first spatial portion of the third clip is selected for display based on the predetermined head orientation value.

19. The device of claim 16, further comprising, while the head orientation of the user is the third head orientation, displaying, on the display, a first spatial portion of a third video clip, wherein the first spatial portion of the third video clip is selected for display based on the third set of one or more head orientation values.

20. A non-transitory computer-readable medium having instructions encoded thereon which, when executed by one or more processors of a device including a display, cause the device to:

while a head orientation of a user is a first head orientation represented by a first set of one or more head orientation values, display, on the display, a first spatial portion of a first video clip;

in response to detecting a change in the head orientation of the user from the first head orientation to a second head orientation represented by a second set of one or more head orientation values, display, on the display, a second spatial portion of the first video clip, wherein the second spatial portion of the first video clip is selected for display based on the second set of one or more head orientation values; and while the head orientation of the user is the second head orientation, display, on the display, a first spatial portion of a second video clip that is selected for display based on a predetermined head orientation value while forgoing display of a second spatial portion of the second video clip that would be selected for display based on the second set of one or more head orientation values representing the second head orientation.

21. The non-transitory computer-readable medium of claim 20, wherein the second set of one or more head orientation values includes a theta value corresponding to an amount of rotation about a vertical axis and the predetermined head orientation value is a predetermined theta value corresponding to an amount of rotation about the vertical axis.

22. The non-transitory computer-readable medium of claim 21, wherein the second set of one or more head orientation values includes a phi value corresponding to an amount of rotation about a horizontal axis, wherein the first spatial portion of the second video clip is selected for display based on the phi value.

23. The non-transitory computer-readable medium of claim 20, wherein the first video clip is a 360-degree video clip.

24. The non-transitory computer-readable medium of claim 20, wherein the instructions further cause the device to cease to display the second spatial portion of the first video clip when starting to display the first spatial portion of the second video clip.

25. The non-transitory computer-readable medium of claim 20, wherein the instructions further cause the device to, in response to detecting a change in the head orientation of the user from the second head orientation to a third head orientation represented by a third set of one or more head orientation values, display, on the display, a second spatial portion of the second video clip, wherein the second spatial portion of the second video clip is selected for display based on the third set of one or more head orientation values.

* * * * *